April 12, 1960 J. E. GALLO 2,932,094
SIMULATED SYNCHRO-PHASING PROPELLER SYSTEM
Filed Feb. 13, 1958
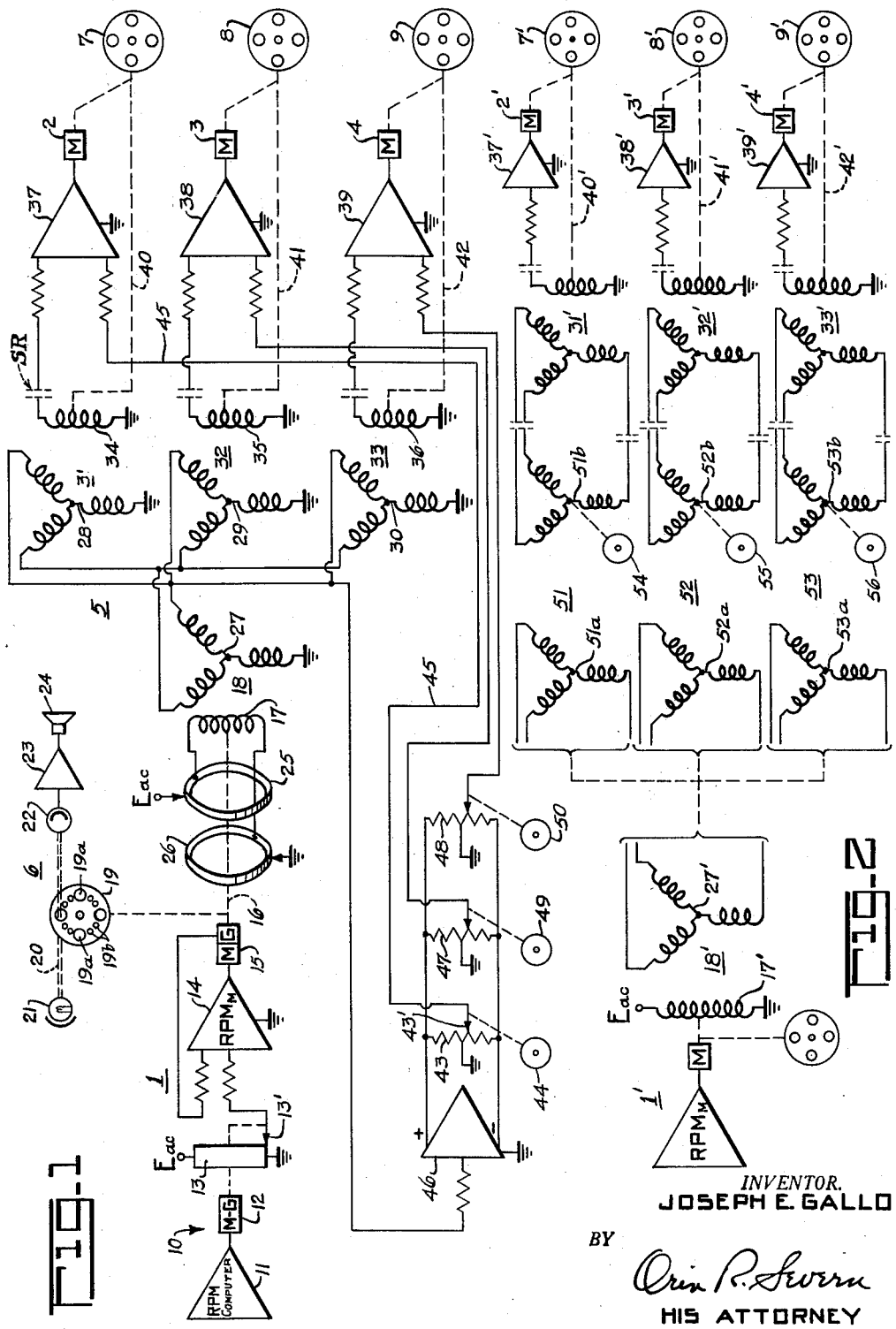
INVENTOR.
JOSEPH E. GALLO
BY
HIS ATTORNEY United States Patent Office 2,932,094
Patented Apr. 12, 1960

2,932,094

SIMULATED SYNCHRO-PHASING PROPELLER SYSTEM

Joseph E. Gallo, Livingston, N.J., assignor to Curtiss-Wright Corporation, a corporation of Delaware Application February 13, 1958, Serial No. 715,049

6 Claims. (Cl. 35—12)

This invention relates to grounded aircraft training apparatus for instructing aircraft personnel, and in particular to apparatus for simulating synchro-phasing control of the propeller system of multi-engine aircraft.

There are in general two principal methods of speed synchronizing the propellers of multi-engine aircraft by means of a master speed control for reducing vibration and noise, namely (1) the use of an indepedently adjustable master r.p.m. control for controlling all the engines, and (2) the use of a master engine control responsive to the speed of a regulated or master engine for controlling the remaining slave engines. Speed synchronization alone however is not always adequate to ensure smooth and relatively quiet operation of the engine-propeller combinations, as the relative angular or phase positions of the propeller blades may also be an important factor in minimizing vibration and noise. For example, all engines may be operating at a completely synchronized speed whereas the blades of two propellers may be so angularly displaced or de-phased, with respect to each other that a certain amount of vibration is produced. This vibration is often minimized by bringing the propeller blades into angular alignment. In actual practice therefore, so-called synchro-phasing control which involves individual adjustment at each slave engine-propeller unit additional to and coincident with speed synchronizing, is used for maintaining the propeller blades in desired angular or phase positions relative to each other. In practice, the flight engineer individually adjusts each of the synchronized engines so as to shift the blades to in-phase angular positions, for example, or wherever the most quiet operation obtains.

Speed synchronizing per se of the propeller system of multi-engine aircraft has been simulated in grounded training apparatus. However synchro-phasing has not to the best of my knowledge been successfully simulated.

A principal object of the present invention therefore is to provide improved apparatus for simulating the propeller operation of multi-engine aircraft including synchro-phasing of the propeller system.

A further object of the invention is to provide improved apparatus of the above character that is realistic in operation and comparatively simple in construction so as to involve a bare minimum of circuitry and apparatus.

The invention will be more fully set forth in the following description referring to the accompanying drawing and the features of novelty will be pointed out with particularity in the claims annexed to and forming a part of this specification.

Referring to the drawing,

Fig. 1 is a partly diagrammatic and schematic illustration of a simulated synchro-phasing system of the type having a master engine control, and Fig. 2 is a similar illustration of another form of the simulated synchro-phasing system according to the invention.

The simulated speed synchronizing control disclosed herein is of the type wherein a master engine that is regulated according to desired speed, controls a plurality of slave engines so that any variation in speed of the master engine is also reflected in the speed of the synchronized slave engines. However it will be apparent that the present invention is as readily applicable to simulation of a system wherein a master speed device is used to control and synchronize all the engines.

Referring to Fig. 1, the simulated synchronizing system for a 4-engine propeller type aircraft essentially comprises a master speed control generally indicated at 1, a plurality of motors schematically indicated at 2, 3 and 4 for representing respectively the slave engines to be synchronized, and electric circuitry including synchronous transmission means generally indicated at 5 interconnecting the master speed control and the individual motors. The motors may conveniently be of the two-phase A.C. type. The master speed control and each motor are mechanically connected to and drive individual simulated engine-propeller sound systems such as the system 6 of the master speed control, and similar systems which are indicated for simplicity by the tone generating wheels 7, 8 and 9 of the respective systems. These tone wheels are driven in synchronism with the respective motors and are designed so as to represent both the engine exhaust and propeller noise.

The master speed control 1 which represents a regulated master engine and speed synchronizing device, comprises means for producing a signal representing the master r.p.m. This may conveniently be obtained from a computing r.p.m. servo system 10 of the position type disclosed for example in U.S. Patent 2,788,589 granted to R. G. Stern. It is therefore not necessary to disclose herein the detailed computing and control circuitry for this system. The servo amplifier 11 of the r.p.m. computer controls through a servo motor and generator (M–G) unit 12 the slider 13' of a potentiometer 13 energized by an A.C. voltage $E_{ac}$, so that the voltage derived at the slider 13' corresponds to the computed r.p.m. of the master engine. This signal is fed to the master r.p.m. ($RPM_m$) amplifier 14, the output of which energizes an M–G unit 15 including a servo motor which may be of the reversible two-phase type also disclosed in the above Patent 2,788,589. The motor drives through a mechanical connection indicated at 16 the primary winding 17 of a synchronous transformer or transmitter 18 and also the tone generating wheel 19 of the sound system 6 so as to rotate in synchronism therewith.

Referring briefly to the sound system which may assume any convenient form, the tone wheel 19 is provided with suitably shaped apertures 19a and 19b for representing respectively the propeller "slap" and the engine exhaust explosions. These apertures are concentrically arranged around the tone wheel so that they can be aligned with a light beam 20 projected from a light source 21 to a photo-electric tube or the like 22. The signals resulting from the light pulses received by the tube 22 are amplified at 23 and fed to a loudspeaker 24, the output of which simulates the combined propeller and engine noise of an engine-prop unit of actual aircraft.

The synchronous transformer 18 is used to transmit the speed synchronizing signals from the master speed control to the respective motors 2, 3 and 4. The transformer primary winding 17 which is rotated by the motor 15 is energized by an alternating current voltage $E_{ac}$ as indicated, through a slip ring 25, the opposite terminal of the winding being grounded through the slip ring 26. For simplicity in illustration, slip rings for movable windings are sometimes indicated in other parts of the circuitry simply by breaks, as at SR, where slip rings are ordinarily used. The secondary winding of the synchronous transformer 18 comprises a fixed three-phase winding 27 from which the speed controlling signals are transmitted to corresponding parallel connected three-phase windings 28, 29 and 30 of the respective synchronous receivers 31, 32 and 33. The secondary windings 34, 35 and 36 of the synchronous receivers are connected through usual proportioning input resistors to the input sides of respective servo motor amplifiers 37, 38 and 39, the outputs of which energize the motors 2, 3 and 4 respectively. The receiver secondaries are mechanically connected as indicated at 40, 41 and 42 to the respective motors so as to rotate therewith in unison. Thus each secondary winding of a receiver rotates in synchronism with its driving motor and tone wheel of the corresponding sound system.

In the arrangement so far described the secondary winding of each synchronous repeater tends to follow the rotation of the primary winding of the master transmitter 18 so as to rotate in synchronism therewith. There will of course be a slight lag or displacement from electrical null at the repeater secondary winding with respect to the transmitter primary so that the signal voltage generated in this winding can be used by the high-gain servo amplifier for operating the motor. Considering the slave motor 2, the mechanical connection at 40 ensures synchronization between the master speed and the motor speed, i.e., if the motor speed should drop off for any reason so that an appreciable speed error exists, the corresponding lag in phase position of the repeater winding 34 would cause an increased signal to be induced in the winding for bringing the motor 2 again up to the master speed.

Simulation of the synchro-phasing control may be accomplished by adjusting the circuitry in one of several ways so that each motor amplifier, 37, etc., may receive a biasing (or biased) signal for shifting the rotor of the motor, 2, etc., through a small angle relative to the angular position of the transmitter winding 17. In Fig. 1 this is accomplished by means of a biasing signal that is fed to the amplifier 37 for example, from an independently adjustable voltage deriving device, such as a potentiometer 43, the slider 43' of which may be individually adjusted as indicated by means of a dial 44 operated by the student. The potentiometer 43 is grounded at its midportion and is energized at its terminals by oppositely phased A.C. voltages as indicated so that a biasing signal of either sense may be fed by conductor 45 to the input side of amplifier 37. This signal, super-imposed on the speed synchronizing signal tends to shift the rotor of motor 2 through a small lead or lag angle depending on the sense and magnitude of the biasing signal.

The potentiometer 43 may conveniently be energized from the output of a "buffer" amplifier 46 that may be in turn energized from the secondary of the synchronous transmitter 18 that normally has a steady voltage, or simply from the current supply, $E_{ac}$. Similar potentiometers 47 and 48 individually adjustable at 49 and 50 likewise provide separate respective biasing signals for the respective motors 3 and 4.

The relative effectiveness of the synchro-phasing control potentiometers is determined by the ratio of the control transformer input resistance to the phasing control input resistance.

It will therefore be seen that the student may practice synchro-phasing the motors 2, 3 and 4 in simulation of actual practice by adjusting the dials 44, 49 and 50 whereby the relative phase positions of the tone wheels can be individually shifted relative to each other and to the master engine so that the combined volume of engine and propeller noise from all the sound systems, representing the cabin sound level, can be reduced to its minimum according to well-known principles of sound resonance. That is, a plurality of trains of sound waves can be combined to produce either maximum or minimum combined volume by shifting the phase relation of the respective trains.

In the arrangement shown by Fig. 2, the motor rotors are shifted to leading or lagging phase relation by a biased signal from the synchronous transmission. This is accomplished by means of a synchro-differential that is connected in each of the parallel synchro-transmission circuits to the respective motors. Elements in Fig. 2 corresponding to those of Fig. 1 are indicated by similar reference numerals (primed) as the operation of this alternative system is basically the same. The master speed control 1' is arranged as in Fig. 1 to generate by means of the synchronous transmitter 18' the speed control signals for governing the slave motors 2', 3' and 4' respectively. The phasing control is introduced by means of additional synchronous transformers 51, 52 and 53 shown connected Y-to-Y in each of the branch circuits between the master transmitter 18' and respective receivers 31', etc. The primary windings 51a, etc. of the synchro-differentials are fixed and the secondary windings 51b, etc. are adapted to be rotated through a phasing angle by means of the student control dials 54, 55 and 56 respectively. Accordingly, it will be seen that the corresponding receivers 31', etc. receive signals that are shifted in either leading or lagging sense with respect to the transmitter 18' according to individual adjustment of the dials 54, 55 and 56. Thus the tone wheels 7', etc. of the corresponding sound systems can be angularly shifted at will independently of each other so that the resultant volume of the combined noise from all the sound systems is a minimum as explained above.

It should be understood that this invention is not limited to specific details of construction and arrangement thereof herein illustrated, and that changes and modifications may occur to one skilled in the art without departing from the spirit of the invention.

What is claimed is:

1. In apparatus for simulating synchro-phasing of the propeller system of multi-engine aircraft comprising a simulated master speed control for producing electric signals representing the desired engine speed, a plurality of electric motors, each representing an aircraft engine to be synchronized at the desired engine speed responsive to said signals so as continuously to rotate at corresponding speed, electrical connections including synchronous transmission means between the master speed control and said rotating motors, a simulated engine sound system for each engine-propeller combination driven by the corresponding motor in synchronism therewith, the improvement comprising means independently operable by a student for separately adjusting the electrical connection between each rotating motor and the master speed control so as to shift the rotor position of each said motor without changing its basic synchronized speed, to angular in-phase or off-phase relationship as desired relative to the other rotor positions according to the observed combined output of the respective engine sound systems.

2. In apparatus for simulating synchro-phasing of the propeller system of multi-engine aircraft comprising a simulated master speed control for producing electric signals representing the desired engine speed, a plurality of electric motors, each representing an aircraft engine to be synchronized at the desired engine speed responsive to said signals so as continuously to rotate at corresponding speed, electric circuitry including synchronous transmitting and receiving means for transmitting said signals to each of said rotating motors, a simulated engine sound system for each engine-propeller combination driven by the corresponding motor in synchronism therewith, the improvement comprising means independently operable by a student for separately adjusting the circuitry between each rotating motor and the master speed control so as to shift the rotor position of each said motor without changing its basic synchronized speed to in-phase or off-phase angular relationship as desired relative to the other rotating rotor positions according to the observed combined output of the respective engine sound systems.

3. Apparatus as specified in claim 1 wherein the means for separately adjusting each electrical connection comprises voltage deriving means for producing a biasing voltage, and means responsive to said voltage for shifting the angular position of the respective rotating rotor.

4. Apparatus as specified in claim 1 wherein the synchronous transmission means comprises a common synchronous transmitter for a master speed signal and a plurality of responsive synchronous receivers for continuously energizing said motors, respectively and wherein the adjustable electrical connection to each rotating motor includes a potentiometer adjustable by the student for producing a biasing voltage, and means responsive to said voltage for shifting the angular phase position of the respective rotating rotor according to said potentiometer adjustment.

5. Apparatus as specified in claim 2 wherein additional synchronous differential means are interposed in the circuitry between the transmitting means and the receiving means for each of said rotating motors, and each differential means is independently adjustable by the student for effecting desired angular phase shift of the respective rotating rotor.

6. Apparatus as specified in claim 5 wherein each synchronous differential means comprises a synchronous transformer, the secondary winding of which is separately adjustable by the student.

References Cited in the file of this patent

UNITED STATES PATENTS

| | | |
|---|---|---|
| 2,400,580 | Wahlberg | May 21, 1946 |
| 2,510,500 | Hayes et al. | June 6, 1950 |